United States Patent [19]
Fabris

[11] Patent Number: 6,106,373
[45] Date of Patent: Aug. 22, 2000

[54] MULTI-TASK GRINDING WHEEL MACHINE

[76] Inventor: Mario Fabris, 188 North Service Road, Grimsby, Ontario, Canada, L3M 4E8

[21] Appl. No.: 08/825,903

[22] Filed: Apr. 2, 1997

[51] Int. Cl.⁷ ....................................................... B24B 49/18
[52] U.S. Cl. ................................ 451/57; 451/11; 451/49; 451/51; 451/242; 451/246; 451/210
[58] Field of Search .................................. 451/9, 10, 11, 451/49, 51, 57, 242, 246, 254, 209, 210

[56] References Cited

U.S. PATENT DOCUMENTS

| | | | |
|---|---|---|---|
| 3,432,972 | 3/1969 | Snyder | 451/242 |
| 4,063,906 | 12/1977 | Wetzels | 451/49 |
| 4,570,386 | 2/1986 | Unno et al. | 451/242 |
| 5,042,206 | 8/1991 | Lambert, Jr. et al. | 451/11 |
| 5,484,327 | 1/1996 | Kovach | 451/49 |
| 5,551,908 | 9/1996 | Harada | 451/49 |
| 5,558,567 | 9/1996 | Hedberg | 451/242 |
| 5,667,432 | 9/1997 | Rollier | 451/242 |
| 5,766,057 | 6/1998 | Maack | 451/51 |

*Primary Examiner*—Eileen P. Morgan
*Attorney, Agent, or Firm*—Edward H Oldham

[57] ABSTRACT

This application relates to a grinding machine which is capable of performing two controlled grinding operations simultaneously on a rotating workpiece.

18 Claims, 2 Drawing Sheets

MULTI-TASK GRINDING WHEEL MACHINE

This invention relates to a production type machine which may be used to produce very accurate cylindrical profiles and finishes on circular workpieces which are rotating whilst being shaped and ground. The invention will be of the form of a grinding machine which utilizes three rotating spindles, a first spindle on which the circular workpiece (a roll for instance) is mounted for rotation about the workpiece spindle axis, a second spindle having a grinding wheel installed thereon for performing a cylindrical grinding operation on the workpiece, and a third spindle having a different shaped grinding wheel installed thereon for performing a different type of grinding operation on the workpiece, say, a profile forming operation which is done simultaneously with the grinding operation being performed on the workpiece by the first grinding wheel. By the use of modern gauging and measuring techniques, the control and feed of both grinding wheels may be computer controlled to permit simultaneous grinding by the two grinding wheels and produce a work product which will be within specified dimensions and tolerances.

BACKGROUND OF THE INVENTION

For some industrial applications, the success of the manufacture of a product depends on the accuracy of the dimensions of a matched pair of rotating roll between which a product must pass during manufacture.

In particular, in the steel industry, for instance, many of the manufacturing operations involve passing a work product between a pair of work rolls having a specially matched, profile of a particular shape to form the work product as it passes between the matched pair of work rolls. In a process for producing steel wire from billet type stock, the work product must be passed through a large number of reducing mill stands to produce the final product. Each mill stand comprises at least a pair of matched work rolls through which the work product must pass. Because of the hostile nature of the material passing between the work rolls, the surfaces of the work rolls will become worn (past a utilization standard) so that the work rolls must be reground and reprofiled. This invention finds application in the regrinding and profiling of worn work rolls and may also find suitable application in the manufacture of new work rolls. The invention may be advantageously applied to grinding workpieces (other than work rolls) of a of a configuration where multiple operations must be performed on the same workpiece.

The problem of accurately grinding matched sets of work rolls for various industrial manufacturing operations has been dealt with in the workplace by tool and die makers for some considerable time. The durability of the rolls in a manufacturing operation has improved as the technology of processes and materials has evolved. Rolls that once were manufactured from steel were replaced with high performance tool steel (which is machinable) only to be replaced with carbide rolls. These rolls contain about 70 to 90% tungsten carbide and are extremely difficult to manufacture by machining, thus in most instances manufacture of tungsten carbide rolls is accomplished by grinding with diamond grinding wheels. Because of the multitude of shapes and sizes of rolls used in a steel manufacturing operation, the regrinding operation may require many diamond wheels, each having a peculiar contour for the production of a specified profile in a particular pair (matched) of rolls in the production facility.

SUMMARY OF THE INVENTION

This invention is directed to a grinding machine which is effective in producing a prescribed profile and a prescribed outer diameter (OD) for a specified roll in a very short time. The production of such a roll is made possible by the provision of three separate rotating spindles which in this instance, all have parallel axes of rotation but in some circumstances, it may be advantageous to have one or more of the grinding axis non-parallel to the work spindle axis.

A rotating spindle having a chucking device of the nature of the device described in applicant's co-pending U.S. application Ser. No. 492,796 filed Jun. 20, 1995 is mounted between a pair of rotatable spindles each carrying a separate and distinct type of grinding wheel.

The axis of both grinding wheel spindles are controllably movable in both x and y axis to allow each grinding wheel to separately and independently move to produce its desired operation.

A finished roll is produced by simultaneous grinding while gauging is simultaneously carried out to control the grinding operations without having to remove the roll from the original set up.

It will be seen that the time required to produce a superior product is drastically reduced over prior art procedures. The capital costs of the inventory of profiled grinding wheels is avoided.

The grinding machine of this invention is by its nature very rugged and the possibility of "chatter" is reduced to a minimum, thus excellent surface finishes are obtained in a very short time.

This machine does not require a tailstock to stabilize the workpiece, thus the "load" and "unload" operations of the workpiece is unencumbered by the presence of a tailstock or other grinder parts extending outwardly along the spindle axis which would usually be present for the mounting of a tailstock thereon. This feature will increase the chances of applying automatic shop procedures for the mounting and dismounting of the workpieces on the chucking device on the workpiece spindle.

This configuration too, is conducive to the production of a practical ergometric method of loading and unloading rolls in the grinding machine, because the operator may stand and face the roll chuck instead of having to lean over the ledge of the grinding machine to insert a heavy roll onto a chuck in the grinding machine.

BRIEF DESCRIPTION OF DRAWINGS

Referring now to FIG. 1, a grinding machine 50 embodying this invention is illustrated. Machine 50 comprises a base 52 on which are mounted three separate motors each driving separate spindles. In the centre of the base 52 is motor 54 which is rigidly attached to base 52. Motor 54 houses a spindle 56 on which is mounted a chucking device 58. Chucking device 58 is preferably the chucking device of U.S. application Ser. No. 492,796 filed Jun. 20, 1995 on which workpiece 60 is clamped. This chucking device which does not require a tailstock, nevertheless is able to provide a rigid mounting for workpiece 60.

Figure 1:
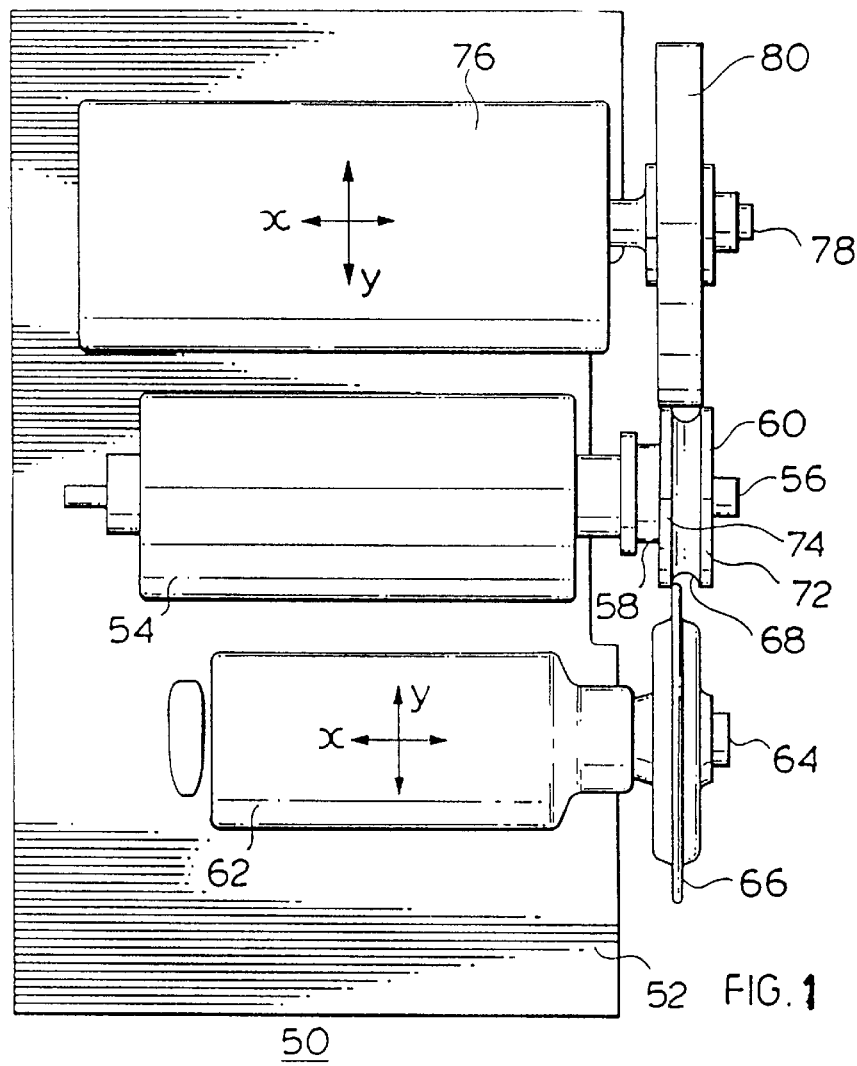
FIG. 1 is a plan view of the grinding machine of this invention.
Figure 2:
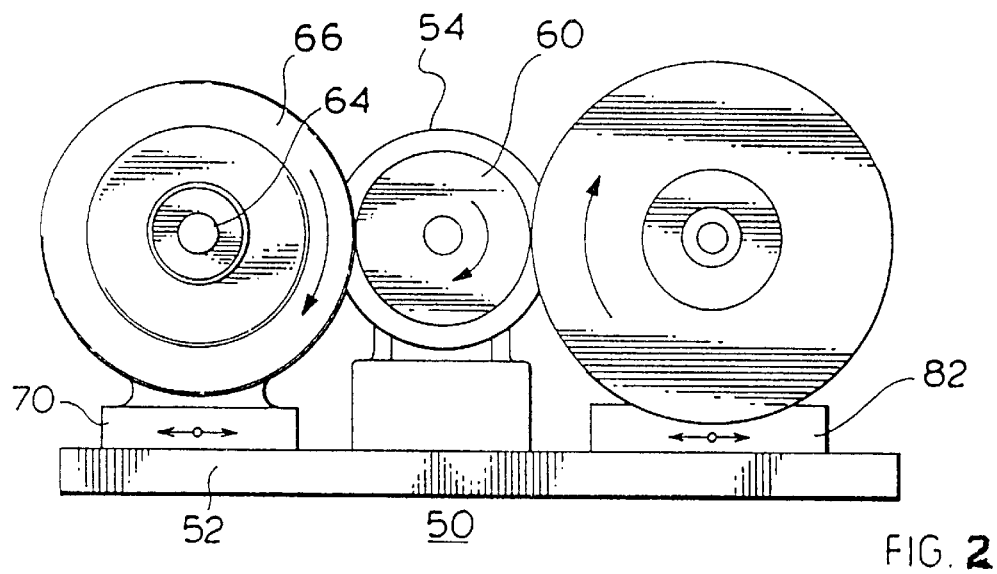
FIG. 2 is an elevation view of the grinding machine of this invention.

Also mounted on base 52 is a grinding motor 62 which has a spindle 64 on which grinding wheel 66 is mounted. Grinding 62 is mounted on drive assembly 70 (FIG. 2) which allows the grinding 62 to be moved in the x and y axial direction by a CNC system. By this means, the specially shaped wheel 66 is made to execute a motion so as to produce the groove 68 in workpiece 60. This motion is preferably produced by ball screw drives which drive the grinder in a very precise fashion in both the x and y directions. The particular drives chosen are rugged and can produce very accurate motion of the grinding devices with little or no deadband effects. These devices are commonly used for such accurate types of drives and the accuracy and long life is achieved by recirculating balls in a helix formed between a "nut" and "threaded shaft".

At the same time as groove 68 is being formed, a gauging mechanism continuously measures and monitors the depth and contour of groove 68 by a MARPOSS™ gauging system. This system provides a feedback signal to the CNC mechanism to control the "x" and "y" motion of the grinding machine 62. A printout by the MARPOSS™ system is produced to detail the groove profile.

As the profile groove 68 is being produced by wheel 66 and monitored by the MARPOSS™ gauging system, the cylindrical surfaces 72 and 74 of workpiece 60 are being ground to specification by grinding machine 76.

Grinding machine 76 comprises a motor housing a spindle 78 on which grinding wheel 80 is mounted. Grinding machine 76 is also movably controlled in both "x" and "y" axis in a manner similar to grinding machine 62. Machine 76 must be accurately controlled in the y direction and thus utilizes a ball screw device type drive for the execution of "y" motion. The motion executed by grinder 76 in the "x" direction i.e. along the axis of spindle 78, for this application is merely an oscillatory motion and for economic purposes and in this instance, is controlled by using a hydraulic driving and controlling means in the "x" direction. (If the grinding operation performed by grinding machine 76 is such that precise control is required in the "x" axis, the hydraulic drive will be replaced by a ball screw drive).

At the same time, the surface abrasion is being constantly measured and continuously monitored by a MARPOSS™ gauging system which produces a printout of the details of the surfaces 72 and 74.

Figure 3:
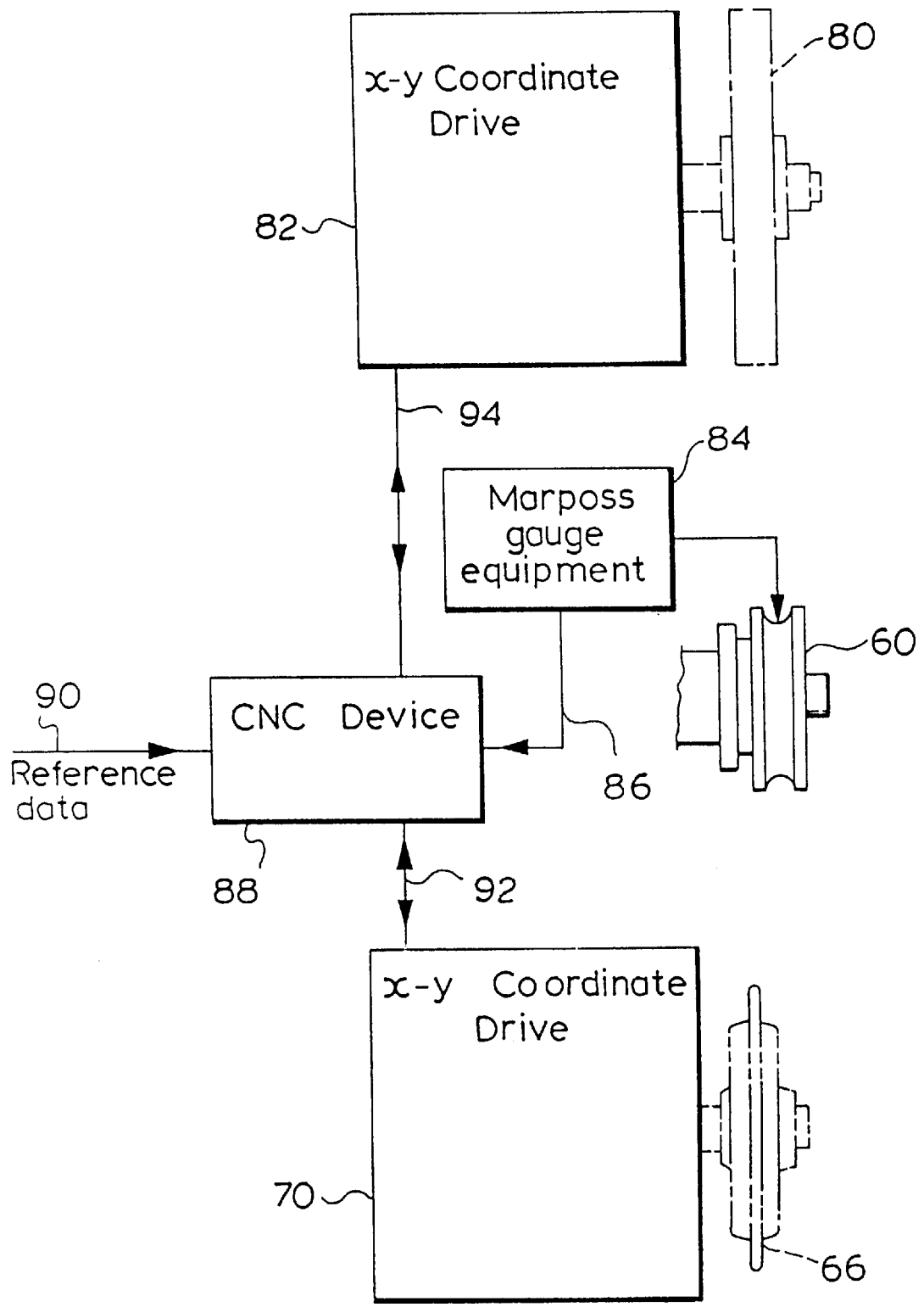
FIG. 3 is a block diagram showing the control circuit for the movement of the grinding machines of FIG. 1.

The control circuit for the drives for the grinders of machine 50 is shown in FIG. 3.

MARPOSS™ gauge equipment is shown in block 84 for monitoring the surface of roll 60. Signals are sent via line 86 to the Computerized Numerical Control Device 88 where the signal data from block 84 is stored and processed.

Reference data is fed by the operator into line 90 where it is processed and compared with the data from block 84. Drive signals for the "x" and "y" co-ordinate drives 70 and 82 are produced and sent to the drives by lines 92 and 94 to cause the drives to execute the precise motion of the respective grinding machines dictated by the CNC device.

Grinding machine 50 is therefore capable of producing a re-manufactured roll or workpiece 60 to very tight specifications in a very short time. Because roll 60 is mounted on chucking device 58 only once, the problems associated with mounting, dismounting and remounting the work in one or more grinding machines is eliminated.

Because the two grinding operations are carried on simultaneously, the two ground surfaces i.e. the cylindrical surface and the groove surface must be concentric.

Thus, the quality of the re-manufactured workpiece is improved whilst the throughput is increased. Operator fatigue is somewhat lessened by employment of this apparatus and method of grinding.

Workpieces such as 60 are usually produced as identical matched pairs for production of roll formed products in the steel industry for instance, thus the ability to repeat the dimensions of roll 60 for its mate is mandatory, and will be readily accomplished by the apparatus of this invention.

Operator training for the production of new or re-manufactured devices such as roll 60 is minimized because of the single mounting requirement for the roll in machine 50. The machine 50 may be pre-programmed to produce the desired profile and OD for various size workpieces.

The MARPOSS™ gauging system provides excellent means to control the overall grinding system.

The grinding operation must be carried on in the presence of a cooling fluid which maintains the temperature of the workpiece as constant as possible.

The relative sizes and speeds of the grinders and workpiece drive may typically be as follows:

Workpiece OD 6 to 14 inches
Drive 3HP 24–70 RPM
PROFILE GRINDER—16 inch wheel
5HP Speed 1450 RPM
CYLINDRICAL GRINDER 24 inch wheel
10HP 900 RPM This invention has been described and illustrated with respect to the production of rolls used in the steel industry. While this invention has excellent application for the purposes described previously herein, the advantages of this invention may be advantageously employed whenever more than one surface preparation operation is required for a rotating workpiece.

This application has illustrated motorized grinding machines for grinding workpieces. Those skilled in the art will realize that for certain grinding operations, the rotating spindles may be driven by belts, gears or shafts for a variety of reasons.

It is not absolutely necessary that the axes of the three spindles be co-planar, but best results will be obtained if the three spindles are kept substantially co-planar.

Although variations in the apparatus are possible, applicant wishes to limit the ambit of protection to the following claims.

I claim:

1. A grinding machine having a specifically defined X and Y axes in an x, y coordinate drive system for precisely grinding a selected area of a roll to a predetermined shape of specific dimensions comprising:

means to mount and rotate said roll about a fixed reference axis in said x, y coordinate system of said machine, a first grinding means moving in said x, y axis for rotatably engaging the peripheral surface at a first side of said rotating roll to produce a cylindrical surface on the periphery thereof by grinding, and, a second grinding means moving in said x, y axes for simultaneously rotatably engaging said periphery of said roll on a side opposite said first side to simultaneously grind a groove in said cylindrical surface, said first and second grinding means being mounted in juxtaposition with said means to mount and rotate said roll on said machine.

2. A grinding machine as claimed in claim 1 wherein the axes of rotation of said roll and said grinding means are substantially parallel.

3. A grinding machine as claimed in claim 2 wherein gauging means monitors and measures the peripheral surface of said roll to produce output signals corresponding to said peripheral surface dimensions.

4. A grinding machine as claimed in claim 3 wherein said output signals are fed into a control device to control the movement of said first and second grinding means in said x, y axes.

5. A grinding machine for mounting and grinding a workpiece thereon comprising:

a base having at least three powered spindle devices mounted thereon such that the three spindles are mounted in a common plane, a first spindle device having a chucking device secured to one end thereof for mounting a workpiece thereon, said first spindle device being rigidly mounted on said base, a second spindle device moving in said plane along x and y axes in an x,y coordinate system, and being mounted on said base on one side of said first spindle device, said second spindle device having a first grinding wheel secured to one end of said spindle device, a third spindle device moving in said plane along x and y axes in said x,y coordinate system, and being mounted on said base on the opposite side of said first spindle device from said second spindle device, said third spindle device having a second grinding wheel secured to one end of said third spindle device, said second and third spindle devices being controllably movable in said plane so as to controllably engage their respective grinding wheels with a common grinding area of said workpiece for simultaneously grinding said area of said workpiece as it rotates, said first, second, and third spindle devices being located in a side by side relationship on said base.

6. A grinding machine as claimed in claim 5 wherein said first grinding wheel mounted on said second spindle device is used for grinding a circular groove in said workpiece, and said second grinding wheel on said third spindle device is capable of producing a cylindrical surface on said workpiece.

7. A grinding machine for grinding the peripheral surface of an annular roll to a predetermined shape and finish comprising:

a motorized workpiece spinning device fixedly mounted in said machine for chucking and rotating said roll about a fixed axis of rotation in a fixed plane, a first motorized grinding device having a first grinding wheel rotating about a first spin axis, having a first motion control means to control the motion of said first motorized grinding device about two orthogonal co-ordinate axes, a second motorized grinding device having a second grinding wheel rotating about a second spin axis, and having a second motion control means to control the motion of said second motorized grinding device about two orthogonal co-ordinate axes, said first and second grinding devices being mounted on said machine in side by side relationship on opposing sides of said workpiece spinning device for suitable simultaneous engagement with the same area of said workpiece so that the planes in which said roll and said grinding devices rotate are maintained in a parallel relationship regardless of the motion of said grinding devices, and access to said roll from a side of said fixed plane remote from said motorized workpiece spinning device is unobstructed.

8. A grinding machine as claimed in claim 7 wherein said first grinding device is equipped with a cylindrical grinding wheel, and said second grinding device is equipped with a grinding wheel having the general shape of a disc.

9. A grinding machine as claimed in claim 8 wherein one of the control axes is parallel to the spin axis of each grinding device.

10. A numerically controlled grinding machine for the production of precisely shaped rolling rolls comprising:

a rigid base having a housing fixedly mounted thereon, said housing having a powered spindle mounted for rotation therein, said spindle having means for securing a roll in a chucking device at one end thereof for rotating said roll so that said roll overhangs, a first powered grinding device having a grinding wheel mounted thereon, said first grinding device being mounted on said base on one side of said housing, and having an x and y co-ordinate drive means to move said first grinding device about "x" and "y" axes in a plane parallel to said base for suitable controlled engagement of said grinding wheel with a preselected area of said rotating roll, a second powered grinding device having a grinding wheel mounted thereon, said second device being mounted on said base on the opposite side of said housing from said first powered grinding device, said second powered grinding device mounted on said base having an "x" and "y" co-ordinate drive means to move said second powered grinding device about "x" and "y" axes in a plane parallel to said base, for suitable controlled simultaneous engagement with said preselected area on the opposite side of said rotating roll from said first grinding device, said first and second powered grinding devices being mounted in juxtaposition with said powered spindle so that access to said roll is unobstructed for mounting and dismounting of said roll on said spindle.

11. A grinding machine as claimed in claim 10 wherein said "x" and "y" axes of said first and second grinding devices coincide and wherein said first grinding device functions to grind a cylindrical surface on said rotating roll, and said second grinding wheel functions to produce a groove in said cylindrical surface of said roll.

12. A grinding machine as claimed in claim 11 wherein gauging means is mounted to monitor the size and surface profile of said rotating roll, and produce a set of output signals corresponding to said size and surface profile of said rotating roll, whereby said "x" and "y" co-ordinate drive means are controlled in accordance with said signals.

13. A grinding machine as claimed in claim 12 wherein the second powered grinding device is equipped with a grinding wheel having the general shape of a disc.

14. A method of grinding the surface of a workpiece comprising:

mounting the workpiece on a suitable rotatable mandrel, rotating said workpiece and mandrel at a pre-selected rotational speed, bringing a first grinding means into contact with a preselected area of the surface of said rotating workpiece, said first grinding means moving along x and y axes in an x,y coordinate system, and simultaneously brining a second grinding means into contact with the same area of surface of said rotating workpiece from a direction radially opposite said first grinding means, said second grinding means moving along x and y axes in said x,y coordinate system, and simultaneously grinding the surface of said rotating workpiece with both grinding means to a predetermined surface profile, retracting both grinding means from the surface of said workpiece, stopping the rotation of said workpiece and, removing workpiece from said mandrel.

15. A method of grinding the surface of a workpiece as claimed in claim 14 wherein said mandrel and said first and second grinding means are separately driven by first, second and third driving means and wherein all said driving means are located adjacent one another.

16. A method as claimed in claim 15 wherein said first grinding means produces a cylindrical grinding surface on said workpiece, and said second grinding means produces a groove in said surface.

17. A method as claimed in claim 16 wherein free access is gained to said workpiece for demounting said workpiece from said mandrel when said first and second grinding means are retracted from said surface.

18. A method as claimed in claim 17 wherein said driving means are electric motors.

* * * * *